No. 878,790. PATENTED FEB. 11, 1908.
H. H. FREUND.
PROCESS FOR FERMENTING BEER, ALE, AND OTHER FERMENTABLE LIQUIDS.
APPLICATION FILED FEB. 6, 1904.
2 SHEETS—SHEET 1.
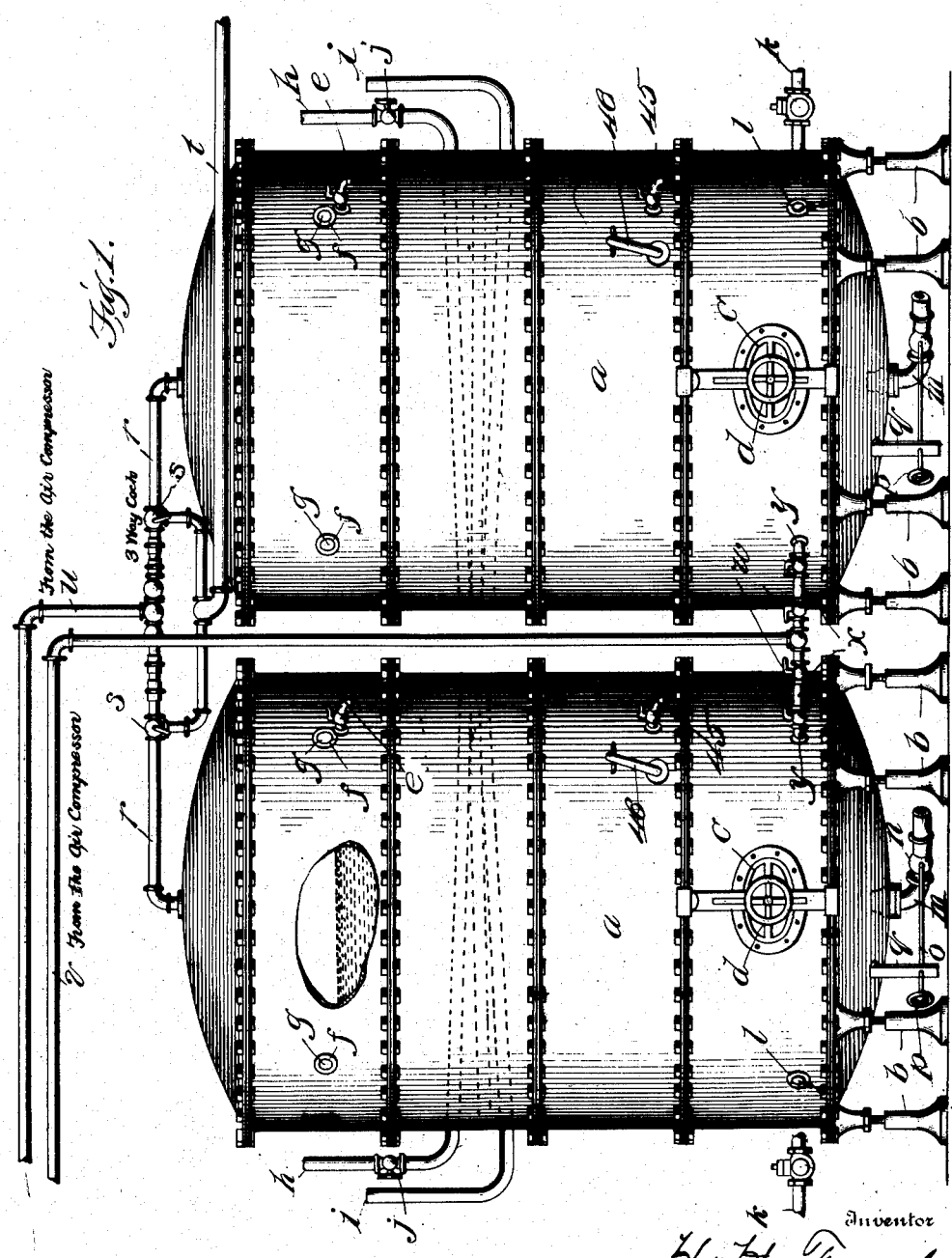

No. 878,790. PATENTED FEB. 11, 1908.
H. H. FREUND.
PROCESS FOR FERMENTING BEER, ALE, AND OTHER FERMENTABLE LIQUIDS.
APPLICATION FILED FEB. 6, 1904.
2 SHEETS—SHEET 2.
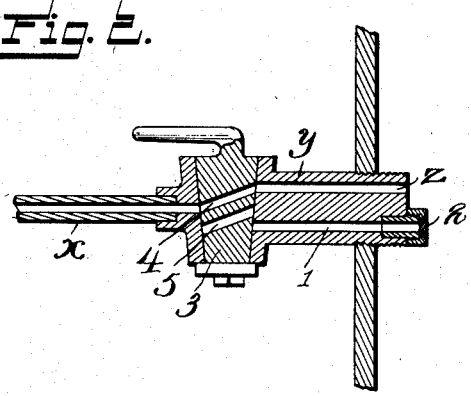
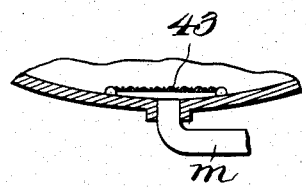 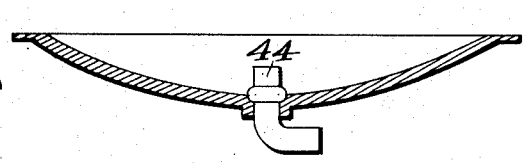
 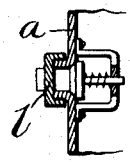
Witnesses
W. May Durall
A. W. Neale, Jr.
Inventor
H. H. Freund.
By Wilkinson & Fisher.
Attorneys.

UNITED STATES PATENT OFFICE.

HANS H. FREUND, OF NEW YORK, N. Y.

PROCESS FOR FERMENTING BEER, ALE, AND OTHER FERMENTABLE LIQUIDS.

No. 878,790.     Specification of Letters Patent.     Patented Feb. 11, 1908.

Application filed February 6, 1904. Serial No. 192,397.

*To all whom it may concern:*

Be it known that I, HANS H. FREUND, a citizen of the United States, residing at New York, in the county of New York and State of New York, have invented certain new and useful Improvements in Processes for Fermenting Beer, Ale, and other Fermentable Liquids; and I do hereby declare the following to be a full, clear, and exact description of the invention, such as will enable others skilled in the art to which it appertains to make and use the same.

My invention relates to an improved process for fermenting beer, ale, and other fermentable liquids, which improved process is fully described and illustrated in the following specification, and the accompanying drawings which show an apparatus adapted to carry out my process—the novel features thereof being specified in the annexed claims.

In the accompanying drawings, Figure 1 represents the fermenting vats and their connections. Fig. 2 is a sectional view of the jets for aerating the liquid to be fermented. Figs. 3 and 4 show sections of modified forms of the lower end of one of the fermenting tanks. Fig. 5 is a cross section of one of the removable bushes, and Fig. 6 is a cross section of one of the spring valves.

The principal feature of my improved process is that the fermentation shall be conducted from start to finish in such a manner as to prevent the entrance of infection into the beer. With this object in view I prefer to conduct the entire fermentation in a closed tank made of steel and lined with enamel, the well known Pfaudler tanks being well suited for this purpose. During the fermentation, no outside air is allowed to come into contact with the liquid. The tanks are kept closed and nothing but sterilized and filtered air is allowed to touch the liquid. After each lot of beer has been fermented, the tank is thoroughly washed and disinfected before another lot of wort is pumped into the tank.

In the drawings $a$ represents the enamel-lined steel tanks. These are supported on the jack screw supports $b$, so that the tanks may be exactly leveled. Each of the tanks is provided with a man-hole having the usual cover $C$ fastened by the usual means $d$.

$e$ represents an overflow cock, which is used for the purpose of testing the beer and for determining the height of the beer in the fermenting casks.

$f$ represents openings about three inches in diameter, which are located a short distance, about one and one-half inches, higher than the overflow cock. These openings are closed by removable bushes $g$ until nearly the close of the fermenting process.

$h$ and $i$ represent the inlet and outlet ends of a pipe, which is coiled within the tank, forming an attemperator, as shown in dotted lines in Fig. 1, for the purpose of circulating a cooling liquid therein to cool the beer when the temperature rises during the process of fermentation.

$j$ represents a cock in the valve $h$ for the purpose of regulating the flow.

During the fermentation, the tanks $a$ are filled with the wort or other liquid to be fermented up to the level of the cocks $e$. Each tank $a$ is provided with a spring valve, which is ordinarily covered by a cap $l$ attached to the tank as shown. The wort is pumped through a valved pipe $k$ into one of the tanks $a$ by means of a hose connection between said pipe $k$ and the spring valve.

$m$ represents a discharge pipe for the beer, located at the bottom of the tank. This discharge pipe or elbow is provided with a valve $n$ mounted on a rod $o$, which is operated by a hand wheel $p$, which is supported in the bracket $q$ attached to the tank $a$, this being for convenience of reaching the same from the outside. The beer is racked often after the fermentation is finished through the pipe $m$, to which a hose is attached in the usual way.

To the top of each tank is attached a pipe $r$ which serves the double purpose of allowing the carbonic acid gas to escape during the preliminary stages of fermentation, and allowing sterilized and filtered air to be pumped into the top of the tank near the close of the fermentation. I have shown this pipe $r$ as entering the tank $a$ centrally of its top, but of course it might enter at any desired point. The pipe $r$ is provided with three-way cocks $s$, of which there is one for each tank, this cock being adapted to be turned so as to discharge the mixed air and gas through the cock directly into the atmosphere during the beginning of the fermentation, or to discharge gas into the pipe $t$ which leads the gas either to a liquefying apparatus, or outside of the building. By turning the cock $s$ still further, air is admitted through the air pipe $u$, which is connected to the air compressing apparatus.

$v$ represents another pipe connected to the air compressing apparatus, and this pipe is removably connected with the base of each of the fermentation tanks by means of an elbow provided with a valve $w$, a short rubber hose $x$, and a faucet $y$ permanently fixed in the wall of the tank $a$. This faucet $y$ is shown in detail in Fig. 3, and is of the form shown in the patent to Wallerstein and Freund, No. 692,170, dated January 28th, 1902. This faucet is provided with two passages, one of them $z$ being for the coarse or strong aeration, and the other, 1, being for the fine aeration. The passage 1 is closed on the inside of the tank $a$ by a plate 2 provided with small perforations. The faucet is provided with a plug 3 with two passages, 4 and 5 therein. By turning the plug the air is directed from the pipe $x$ into either of the passages $z$ or 1, at will. Any suitable means for supplying cooled and sterilized air to the tanks $a$ may be used.

To prevent the yeast passing out with the beer, when the latter is racked off, I have shown means in Figs. 3 and 4. In Fig. 4, a removable screen 43 is located over the discharge orifice, and in Fig. 3, a removable boss 44 is fitted into the end of the discharge pipe, the boss rising above the bottom thereof some little distance, the yeast settling around said boss 44. 45 represents a test cock and 46 a thermometer.

In carrying out my improved process, the wort is mixed with yeast, or pitched, in one of the tanks $a$, the temperature being preferably $5\frac{1}{2}$ to 6 degrees R. (44.4 to 45.5 F.), and the quantity of yeast used being about .8 or .9 of a pound to the barrel. The wort remains in the tank for about 20 to 24 hours and is subjected to a strong aeration by means of air at a pressure of about 20 pounds, which is blown in through the opening $z$ in the faucet $y$. The purpose of this aeration is to thoroughly mix the wort, although incidentally this aeration supplies oxygen to the wort which aids in the fermentation. This strong aeration is used intermittently for a minute or two once every three or four hours during the first stage of the fermentation, at the end of which time a white foam forms on the top of the wort showing that the fermentation has set in and that the yeast has begun to sprout, the dead yeast cells and the albuminoids falling to the bottom.

Some brewers use starting tanks in the fermentation process in order to get rid of the hop resins and albuminoids before the main fermentation begins. Therefore, in my process a starting tank may be used, but this is not necessary, and indeed, I prefer to conduct the entire fermentation in the closed steel tanks $a$. If a starting tank is used, the wort remains therein for about 20 to 24 hours and is subjected to a strong aeration as already described. After the strong aeration, whether this is conducted in a starting tank or in the tank $a$, the wort is subjected to a fine aeration (the cock 3 being turned so that the air passes in through the pipe $v$ through the opening 1 into the tank $a$). This aeration is continued for six or eight hours steadily. No fixed rule, however, can be laid down as to the exact quantity of air to be used; this depends upon many factors, the quality of the wort, the quality of the beer desired, and the quality of the yeast, and must, to a certain extent, be left to the judgment of the brewer in each case. Usually six to eight hours of fine aeration is sufficient, although it may be employed longer if found necessary. After the fine aeration is stopped, and the air and gas flow out of the three-way cock $s$, the gas coming out is tested. The carbonic acid gas being the heavier, the air, speaking generally, will come out first, although of course it will be mixed with a little carbonic acid gas. As soon as the test shows that the escaping gas contains 99 per cent., or more, of carbonic acid gas, the three-way cock $s$ is turned so as to divert the gas, which has been escaping into the atmosphere, into the pipe $t$ through which it is conducted away for the purpose of carbonating beer already fermented, or for liquefaction, or to be thrown away, as desired. The fermentation is then allowed to continue for five or six days, and the temperature gradually rises. When the temperature reaches $8\frac{1}{2}$ or 9° R., 51 to $52\frac{25}{100}$ F., as will be indicated by the thermometer on the tank $a$, the cooling liquid in the attemperator is turned on, and the beer is kept at this temperature until the wort shows a good break, that is to say, when the yeast shows a flaky appearance. This may be found out by drawing out small samples of the beer through any of the cocks in the tank and testing it. The saccharimeter indication should be taken every day, and when this indication shows 1 per cent. higher than what is desired over the final fermentation, the liquid is subjected to the final step, which consists in removing the bushes $g$, which allows the carbonic acid gas to flow out of the openings $f$ by its own weight, and replacing the carbonic acid gas by air through the pipes $u$ and $r$. In other words, if it is desired to ferment from 12 per cent. down to 4 per cent. as shown by the saccharimeter, this final step should be taken when the saccharimeter indicates anywhere from $4\frac{3}{4}$ to 5 per cent. The tank $a$ is of course never charged up to the level of the bushes $g$.

To insure proper clarification of the beer it is indispensable that the last stages of the fermentation proceed without any layer of carbonic acid gas above the beer, and according to my process, it is also indispensable that as this carbonic acid gas flows out by its own weight, no impure cellar air should be allowed to enter, and this is effected by causing a gentle stream of sterilized air to flow in through the pipes $u$ and $r$. After the beer is well broken, its temperature is carried down as low as possible, say to about 3° R., which usually takes no longer than 24 hours, so that the whole fermentation, including the cooling, takes place in a single tank and within 7 or 8 days.

When the fermentation is completed, the beer is racked through the elbow $m$, through a racking pipe to a chip cask, and there finished in the usual way. The yeast is prevented from running out of the bottom by means of the devices shown in Figs. 3 and 4, although any sort of a straining device may be used. After the tank is emptied, the screen 43 or the boss 44 is removed and the yeast is washed out through the racking pipe into a yeast back or receptacle. The yeast, after being cleansed, is used in subsequent fermentation. After the yeast has been drawn out, the tank and the racking pipes are thoroughly washed and cleansed, this being an important part of my process, the principle of which is to prevent the entrance of infection into the beer in every possible way, and at every stage of the fermentation.

Having thus described my invention, what I claim as new and desire to secure by Letters Patent is:—

1. The herein described process of fermenting fermentable liquids which consists in partially filling the prepared wort into a closed tank provided with an escape orifice in its unfilled portion, strongly aerating the wort at intervals, for the purpose of agitating it, until its surface is covered with a white foam, then subjecting the wort to a fine aeration for the purpose of supplying oxygen to the wort, and incidentally agitating it, allowing the fermentation to quietly proceed for a considerable time, discharging the carbonic gas from the unfilled portion of the tank, cooling the fermenting liquid near the end of the fermentation, and allowing the carbonic acid gas to flow out by its own weight, and replacing said gas by sterilized air, substantially as described.

2. The herein described process of fermenting fermentable liquids entirely out of contact with the atmosphere which consists in partially filling the prepared wort into a closed receptacle provided with an escape orifice in its unfilled portion, in strongly aerating the wort at intervals with sterilized air for the purpose of agitating it for a period of about 20 hours or until a white foam forms on its surface, then subjecting the wort to a fine aeration with sterilized air for about 6 to 8 hours for the purpose of supplying oxygen to said wort, then allowing the liquid to ferment quietly for a considerable time, cooling the liquid during this period of quiet fermentation, allowing the carbonic acid gas generated to flow out by its own weight and replacing it by sterilized air, thereby clarifying the liquid, and racking it, substantially as described.

3. The herein described process of fermenting fermentable liquids, consisting in partially filling the prepared wort into a closed tank provided with an escape orifice in its unfilled portion, strongly aerating the wort with sterilized air at intervals until a white foam forms on its top, subjecting the wort to a fine aeration for the purpose of supplying oxygen thereto, then allowing the fermentation to proceed quietly for a time, discharging the carbonic acid gas from the unfilled portion of the tank, preventing the return of the carbonic acid gas into the tank, allowing the carbonic acid gas to flow out by its own weight and replacing it by sterilized air, and finally cooling the liquid, substantially as described.

In testimony whereof, I affix my signature, in presence of two witnesses.

HANS H. FREUND.

Witnesses:
R. JULIUS MUNZ,
H. A. SCHALK.